US009488734B2

(12) United States Patent
Davain

(10) Patent No.: US 9,488,734 B2
(45) Date of Patent: Nov. 8, 2016

(54) INERTIAL NAVIGATION SYSTEM USING HYBRID NAVIGATION VIA INTEGRATED LOOSE COUPLING

(71) Applicant: SAGEM DEFENSE SECURITE, Boulogne-Billancourt (FR)

(72) Inventor: Loic Davain, Paris (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 641 days.

(21) Appl. No.: 14/046,865

(22) Filed: Oct. 4, 2013

(65) Prior Publication Data

US 2016/0216378 A1    Jul. 28, 2016

(30) Foreign Application Priority Data

Oct. 5, 2012 (FR) ..................... 12 02667

(51) Int. Cl.
*G01S 19/20* (2010.01)
*G01S 19/39* (2010.01)
*G01C 21/16* (2006.01)

(52) U.S. Cl.
CPC ............ *G01S 19/39* (2013.01); *G01C 21/165* (2013.01)

(58) Field of Classification Search
None
See application file for complete search history.

(56) References Cited

U.S. PATENT DOCUMENTS

| | | | | |
|---|---|---|---|---|
| 8,855,241 B2 * | 10/2014 | Ting | .................... | G01S 19/21 375/316 |
| 2001/0045903 A1 * | 11/2001 | Chang | ................... | G01S 5/0054 342/357.43 |
| 2007/0156338 A1 * | 7/2007 | Coatantiec | .............. | G01S 19/23 701/472 |
| 2007/0265810 A1 * | 11/2007 | Martin | ................. | G01C 21/165 702/190 |
| 2012/0038512 A1 * | 2/2012 | Geswender | ............. | G01S 19/21 342/357.59 |
| 2014/0074397 A1 * | 3/2014 | Vanderwerf | ............ | G01S 19/20 701/472 |

OTHER PUBLICATIONS

A New Failure Detection Approach and Its Application to GPS Autonomous Integrity Monitoring—by Ren Da and Ching-Fang Lin, Published in IEEE Tranactions on Aerospace and Electronic Systems, vol. 31 Issue 1, Jan. 1995.*

(Continued)

*Primary Examiner* — John R Olszewski
*Assistant Examiner* — Jess Whittington
(74) *Attorney, Agent, or Firm* — Blakely Sokoloff Taylor & Zafman LLP

(57) ABSTRACT

An inertial navigation system using loose coupling hybridization of inertial measurements by utilizing measurements supplied by a satellite-positioning receiver which utilizes signals sent by a plurality of satellites distributed across at least two separate satellite subsets and calculates at least two navigation solutions, each navigation solution being calculated by means of signals sent by the satellites of one of the subsets. The inertial navigation system includes a hybridization module using each of the at least two calculated navigation solutions. A satellite failure detector is configured to compare the hybrid navigation solutions and where applicable detect incoherence between said hybrid navigation solutions. The hybridization module is configured to stop execution of hybridization following detection of incoherence between the hybrid navigation solutions when the origin of the incoherence cannot be determined.

10 Claims, 2 Drawing Sheets

(56) References Cited

OTHER PUBLICATIONS

Figure 1:
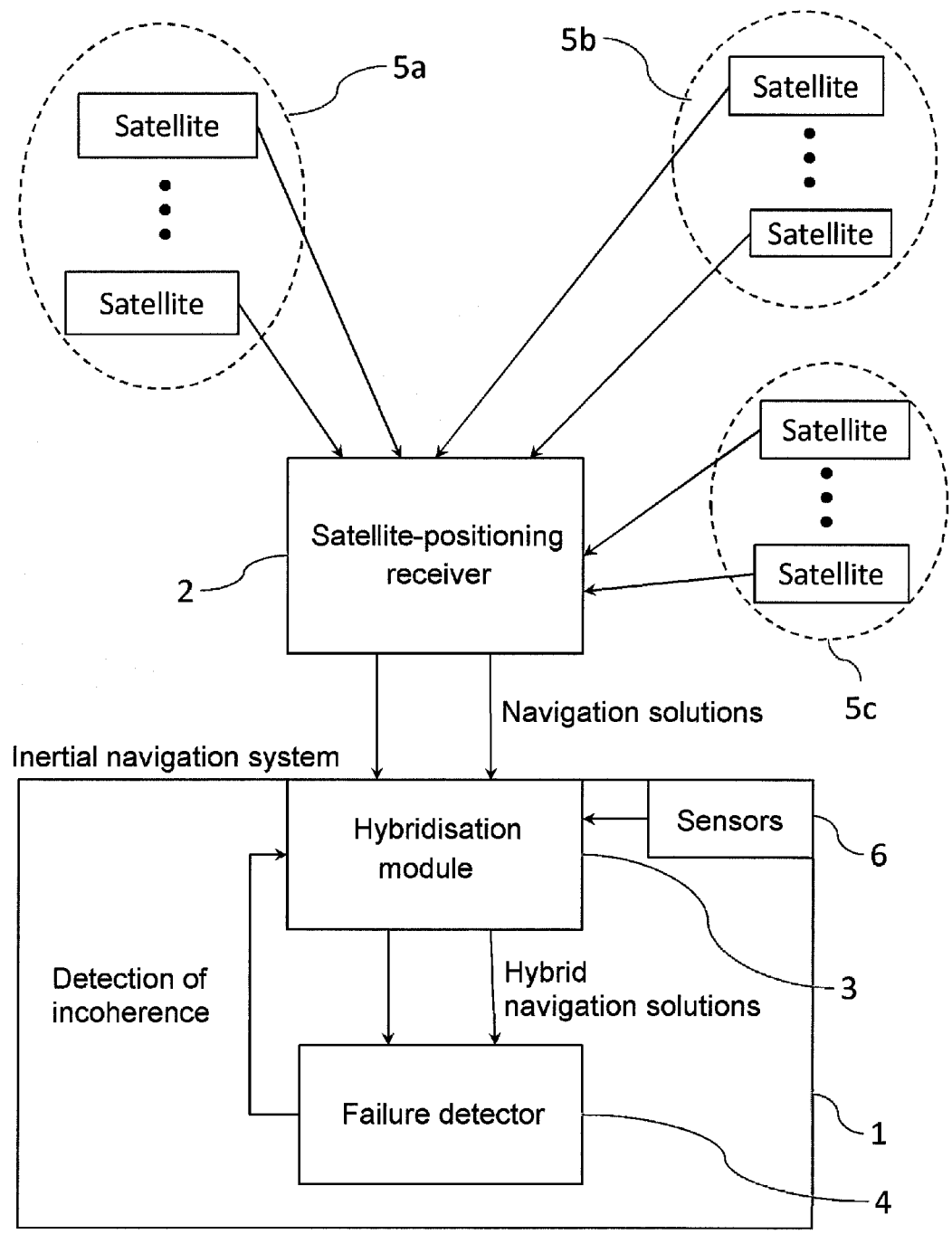

Da, Ren, et al. "A New Failure Detection Approach and Its Application to GPS Autonomous Integrity Monitoring." *IEEE Transactions on Aerospace and Electronic Systems*, vol. 31, No. 1., pp. 499-506. IEEE Service Center, Piscataway, NJ, U.S. (Jan. 1, 1995). 8 pages.

Call, Curt, et al. "Performance of Honeywell's Intertial/GPS Hybrid (HIGH) for RNP Operations." Position, Location, and Navigation Symposium, 2006 IEEE/Ion. IEEE, Coronado, CA. Apr. 25-27, 2006. Piscataway, NJ, U.S. (Apr. 25, 2006), pp. 244-255. 12 pages.

\* cited by examiner

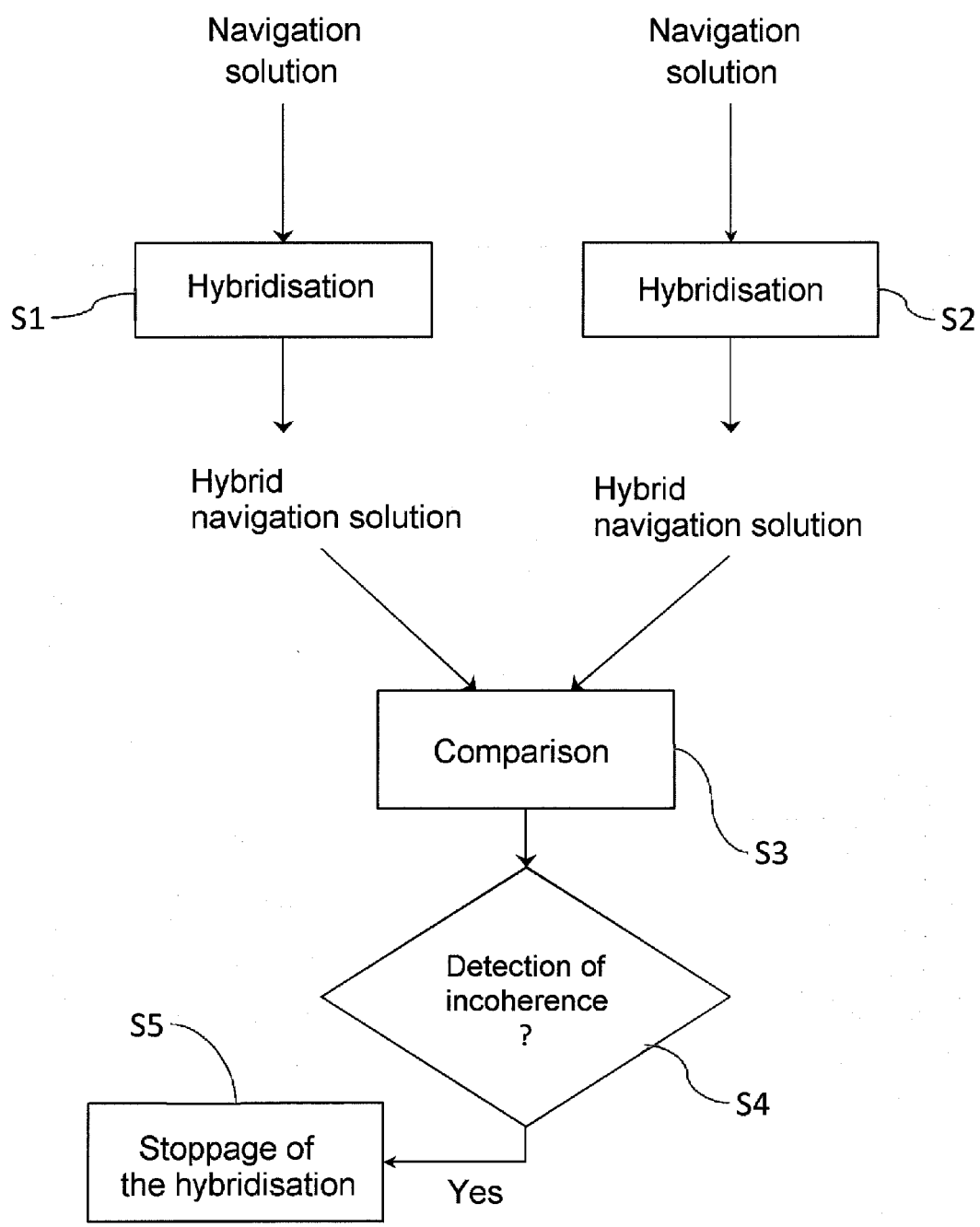

INERTIAL NAVIGATION SYSTEM USING HYBRID NAVIGATION VIA INTEGRATED LOOSE COUPLING

FIELD OF THE INVENTION

The field of the invention is that of inertial navigation systems executing hybridization of inertial navigation by utilizing signals sent by a plurality of satellites distributed across at least two separate satellite subsets, typically, but not in any way limiting, multi-constellation GNSS (<<Global Navigation Satellite System>>) receivers. The invention relates more particularly to such inertial navigation systems using loose coupling navigation hybridization, and relates to executing hybridization with protection in terms of the integrity of output data.

BACKGROUND OF THE INVENTION

Patent application WO 2010/070012 A1 discloses a solution for ensuring the navigation integrity of a system using a GNSS receiver for executing close coupling hybridization. This solution is based on a bank of Kalman filters and the use of raw measurements supplied by the GNSS receiver, typically the pseudo-ranges between the receiver and each satellite of a constellation. The document "*A new failure detection approach and its application to GPS autonomous integrity monitoring*", by Ren Da et al., IEEE transactions on aerospace and electronic systems, vol. 31, no. 1, Jan. 1, 1995, also has a similar approach.

This solution requires having access to all GNSS measurements. Some GNSS receivers do not allow access to these measurements (especially pseudo-ranges) and provide only the navigation solution of the receiver (position, speed, time).

This solution also has the drawback of needing a large number of Kalman filters (typically 12 for one constellation of satellites). Some inertial navigation systems have no sufficiently powerful processors to run such a battery of filters.

Finally, this solution takes into consideration only a single constellation of satellites, whereas some receivers exploit signals originating from satellites belonging to several constellations (GPS, Glonass, and soon Galileo, Compass . . . ).

There is a need for an alternative solution which can ensure the integrity of hybrid navigation of a multi-constellation loose coupling system and which can advantageously be executed by means of a limited number of Kalman filters to be implemented on processors of lesser capacity.

EXPLANATION OF THE INVENTION

The aim of the invention is to respond to this need and for this purpose proposes according to a first aspect an inertial navigation system executing loose coupling hybridization of inertial measurements by utilizing measurements supplied by a satellite-positioning receiver which utilizes signals sent by a plurality of satellites distributed across at least two separate satellite subsets and calculates at least two navigation solutions, each navigation solution being calculated by means of the signals sent by the satellites of one of the subsets, the inertial navigation system comprising a hybridization module using each of said at least two navigation solutions calculated by the satellite-positioning receiver to calculate hybrid navigation solutions,
the inertial navigation system comprising a satellite failure detector configured to compare said hybrid navigation solutions and where applicable detect incoherence between said hybrid navigation solutions, said incoherence being synonymous with a satellite failure belonging to one of the subsets, and wherein the hybridization module is also configured to stop execution of hybridization following detection of incoherence between said hybrid navigation solutions.

Some preferred, though non-limiting, aspects of this inertial hybrid navigation system are the following:
- the inertial navigation system exploits the information supplied by a module belonging to the satellite-positioning receiver for receiver integrity surveillance capable of identifying and excluding the failed satellite;
- the satellites are distributed across two separate satellite subsets, and the hybridization module is also configured to resume execution of hybridization once the failed satellite is identified and excluded;
- the satellites are distributed across at least three separate satellite subsets, and the satellite failure detector is configured to identify the subset to which the failed satellite belongs, the hybridization module is configured to execute hybridization by using the navigation solutions calculated by the satellite-positioning receiver by means of signals sent by the satellites of the subsets to which the failed satellite does not belong before the failed satellite is identified and excluded and to resume execution of hybridization with all the navigation solutions calculated by the satellite-positioning receiver once the failed satellite is identified and excluded;
- the satellite failure detector comprises a bank of Kalman filters comprising a principal Kalman filter receiving a mixed navigation solution worked out by the satellite-positioning receiver by means of the signals sent by all of the satellites and n secondary Kalman filters each receiving the navigation solution calculated by the satellite-positioning receiver by means of the signals sent by the satellites of one of the subsets;
- the satellite failure detector comprises a bank of Kalman filters comprising a principal Kalman filter receiving all the navigation solutions calculated by the satellite-positioning receiver and n secondary Kalman filters each receiving all the navigation solutions calculated by the satellite-positioning receiver excluding the navigation solution calculated by means of the signals sent by the satellites of one of the subset;
- the satellites belong to several constellations of satellites;
- each subset of satellites corresponds to one of the constellations.

According to a second aspect, the invention relates to a positioning system comprising an inertial navigation system according to the invention and a satellite-positioning receiver which utilizes signals sent by a plurality of satellites distributed across at least two separate satellite subsets and calculates at least two navigation solutions.

According to a third aspect, the invention relates to a process of loose coupling hybridization of inertial measurements utilizing measurements supplied by a satellite-positioning receiver which utilizes signals sent by a plurality of satellites distributed across at least two separate satellite subsets and calculates at least two navigation solutions, each navigation solution being calculated by means of signals sent by the satellites of one of the subsets, wherein hybridization provides hybrid navigation solutions corresponding to the result of the loose coupling hybridization using each of said at least two navigation solutions, and
comprising execution of a comparison of said hybrid navigation solutions to detect where applicable incoherence between said hybrid navigation solutions, said incoherence being synonymous with satellite failure belonging to one of the subsets, and by the stoppage of hybridization following detection of incoherence between said hybrid navigation solutions.

PRESENTATION OF FIGURES

Other aspects, aims and advantages of the present invention will emerge more clearly from the following detailed description of preferred embodiments of the latter, given by way of non-limiting example, and made in reference to the attached figures, wherein FIG. 1 illustrates a positioning system comprising an inertial navigation system according to a possible embodiment of the invention;

FIG. 2 illustrates a hybridization process according to a possible embodiment of the invention.

DETAILED DESCRIPTION OF THE INVENTION

According to its first aspect and in reference to FIG. 1, the invention relates to an inertial navigation system 1 executing loose coupling hybridization of inertial measurements by utilizing measurements supplied by a satellite-positioning receiver 2 (GNSS receiver hereinbelow) which utilizes signals sent by a plurality of satellites distributed across at least two separate satellite subsets 5a, 5b, 5c. In a preferred implementation which will be taken as an example hereinbelow, each subset 5a, 5b, 5c corresponds to a constellation of satellites (GPS, Glonass, soon Galileo). The invention is not however limited to this preferred implementation but extends to subsets which may comprise some satellites of one constellation only, or satellites belonging to several constellations. The sole limitation here is the number of satellites per subset 5a, 5b, 5c, which must be at least 4, to enable calculation of a position of the receiver on the basis of signals sent by the satellites of a subset 5a, 5b, 5c. Given two separate satellite subsets 5a, 5b, two positions of the receiver 2 are calculated which are independent of each other. Each satellite preferably belongs to a single subset 5a, 5b, 5c to statistically guarantee this independence.

The GNSS receiver 2 comprises a navigation calculator configured to calculate at least two navigation solutions (data for position, velocity and time: known under the acronym PVT), each navigation solution being calculated by means of signals sent by the satellites of one of the subsets. Using the example of a multi-constellation GNSS GPS, Glonass and Galileo receiver, there is the following information: PVT GPS solution, PVT Glonass solution, PVT Galileo solution.

The inertial navigation system 1 also comprises a hybridization module 3 using said at least two navigation solutions originating from the GNSS receiver 2 for executing loose coupling navigation hybridization. So, the hybridization module 3 utilizes each of the at least two navigation solutions originating from the GNSS receiver 2 to hybridize the inertial measurements originating from sensors 6 and to calculate at least two hybrid navigation solutions.

Reference will be made hereinbelow to loose coupling position hybridization. The invention is not however limited to this loose coupling mode, but also extends to loose coupling utilizing some and/or other PVT data (loose coupling position and velocity, for example).

In general, the invention proposes analyzing the distance between each of the hybrid navigation solutions originating from the hybridization module 2 and which are theoretically coherent and independent. If one of the hybrid navigation solutions differs from the others, there is therefore a strong probability that this hybrid navigation solution is undergoing a failure, that is, one of the satellites belonging to the subset of satellites 5a, 5b, 5c considered by the GNSS receiver 2 for calculating the navigation solution used for this hybrid navigation is undergoing failure.

Within the scope of the invention, the inertial navigation system 1 has a satellite failure detector 4 configured to compare the hybrid navigation solutions and where applicable detect incoherence between said hybrid navigation solutions, this incoherence being synonymous with a satellite failure belonging to one of the subsets 5a, 5b, 5c. The hybridization module is configured to stop execution of hybridization following detection of incoherence between said hybrid navigation solutions.

In a first case in point, the satellites are distributed across two separate satellite subsets 5a, 5b (for example this is the case for a bi-constellation GPS/Glonass GNSS receiver where each constellation forms a subset). If the distance between the two hybrid navigation solutions exceeds a threshold, the satellite failure detector 4 will deduce that there is a failure. It is not however possible to isolate the satellite subset 5a, 5b affected by the failure, such that the two navigation solutions will be invalidated.

In a second case in point, the satellites are distributed across at least three separate satellite subsets 5a, 5b, 5c (for example this is the case for a GPS/Glonass/Galileo GNSS tri-constellation receiver where each constellation forms a subset). If one of the distances between the hybrid navigation solutions exceeds a threshold, the satellite failure detector 4 will deduce that there is a failure and will be able to identify which satellite subset 5a, 5b, 5c is affected by the failure (in fact, the only subset affected by the failure will provide an incoherent navigation solution relative to the two other subsets). This satellite subset is excluded, and hybridization is resumed by utilizing the navigation solutions calculated by the GNSS receiver 2 on the basis of the non-excluded satellite subsets (two positions instead of three in the example).

In one and the other of these cases in point, the invention further proposes that the inertial navigation system 1 utilizes the information supplied by a module classically used in a GNSS receiver autonomous integrity monitoring (RAIM for <<Receiver Autonomous Integrity Monitoring>>) to identify and exclude (at the receiver level) the failed satellite. Once the failed satellite is excluded, hybridization is resumed by utilizing all the navigation solutions calculated by the GNSS receiver 2 (after verification of the coherence of the position corrected relative to the other positions).

The difference between the two cases in point exposes hereinabove therefore lies in the fact that in the second case in point hybridization is not interrupted during waiting for RAIM exclusion, but simply degraded to exploit a reduced number of navigation solutions.

Two possible embodiments of the satellite failure detector 4 are described hereinbelow.

According to a first embodiment, the satellite failure detector 4 comprises a bank of Kalman filters comprising a principal Kalman filter receiving a mixed navigation solution worked out by the GNSS receiver from all the pseudo-ranges at its disposition and n secondary Kalman filters each receiving the navigation solution calculated by the GNSS receiver 2 by means of signals sent by the satellites of one of the subsets 5a, 5b, 5c. Referring again to the example of the tri-constellation receiver, the satellite failure detector comprises a principal Kalman filter receiving a single GNSS solution obtained from all the pseudo-ranges of the visible satellites of three constellations and three secondary Kalman filters each receiving some of the following information: GPS Solution, Glonass Solution, Galileo Solution.

In the absence of satellite failure, the hybrid navigation solutions worked out by the filters overall form a uniform cloud of points. In the presence of satellite failure, the navigation solution calculated by the GNSS receiver 2 by utilizing signals originating from the subset satellites to which the failed satellite belongs derives slowly. This will contaminate only one of the secondary filters such that the hybrid navigation solution worked out by this secondary filter will move away from the other hybrid navigation solutions (one point detaches from the cloud of points) to the point where a contradiction between the hybrid navigation solutions of the non-contaminated filters and the contaminated filter can be detected. The principal Kalman filter provides <<effective>> navigation in the absence of failure. In the case of failure, this filter is reconfigured from the GNSS navigation solutions validated by the failure detector.

According to a second embodiment the satellite failure detector 4 comprises a bank of Kalman filters comprising a principal Kalman filter receiving all the navigation solutions calculated by the GNSS receiver 2 and n secondary Kalman filters each receiving all the navigation solutions calculated by the GNSS receiver 2 excluding the navigation solution calculated by the GNSS receiver 2 from signals sent by the satellites of one of the subsets 5a, 5b, 5c. Referring again to the example of the tri-constellation GNSS receiver, the principal Kalman filter receives the three items of information of the GPS Solution, Glonass Solution, Galileo Solution, whereas the three secondary Kalman filters respectively receive the following two items of information: GPS Solution and Glonass Solution for the first; GPS Solution and Galileo Solution for the second; Glonass Solution and Galileo Solution for the third.

In the absence of satellite failure, the hybrid navigation solutions worked out by the filters overall form a uniform cloud of points. In the presence of satellite failure (for example GPS), the hybrid navigation solution (Glonass and Galileo) calculated by not utilizing signals originating from the subset satellites to which the failed satellite belongs derives slowly. In parallel, the GPS solution will contaminate the other secondary filters and the main filter (specifically in the example, the secondary GPS and Galileo and GPS and Glonass filters). In this way all the points diverge, with the exception of the point corresponding to the secondary filter not affected by the failure. A contradiction is detected between the hybrid navigation solution of the non-contaminated filter and those of the contaminated filters. The principal filter is reconfigured by recopying the secondary filter which has been revealed.

In reference to FIG. 2, it will be evident that the invention is not limited to the navigation system according to its first aspect, but also extends to a loose coupling hybridization process of inertial measurements utilizing measurements supplied by a satellite-positioning receiver 2 which utilizes signals sent by a plurality of satellites distributed across at least two separate satellite subsets 5a, 5b, 5c and calculates at least two navigation solutions, each navigation solution being calculated by means of signals sent by the satellites of one of the subsets 5a, 5b, 5c, wherein hybridization S1, S2 provides hybrid navigation solutions corresponding to the result of loose coupling hybridization S1, S2 using each of said at least two navigation solutions, comprising the execution of a comparison S3 of said hybrid navigation solutions to, where applicable, detect incoherence S4 between said hybrid navigation solutions, said incoherence being synonymous with a satellite failure belonging to one of the subsets 5a, 5b, 5c, and by stoppage of the hybridization S5 following detection of incoherence between said hybrid navigation solutions.

In the event where at least three satellite subsets 5a, 5b, 5c are used, following detection of satellite failure, stoppage of hybridization S5 can be limited to the time necessary for identifying and excluding the subset 5a, 5b, 5c affected by the failure. Hybridization S1, S2 is resumed by utilizing the navigation solutions (positions especially) calculated by the GNSS receiver for the subsets not affected by the failure. RAIM analysis can be performed to identify and exclude the failed satellite at the GNSS receiver 2 level. Once the latter is excluded, hybridization 5a, 5b, 5c can resume with all navigation solutions calculated by the GNSS receiver 2.

In the event where two satellite subsets 5a, 5b are used, hybridization resumes only after RAIM analysis has identified and excluded the failed satellite.

The invention also extends to a positioning system comprising an inertial navigation system 1 according to its first aspect and a satellite-positioning receiver 2 which utilizes signals sent by a plurality of satellites distributed across at least two separate satellite subsets 5a, 5b, 5c and calculates at least two navigation solutions, each navigation solution being calculated by means of signals sent by the satellites of one of the subsets 5a, 5b, 5c.

The invention claimed is:

1. An inertial navigation system comprising sensors providing inertial measurements, said inertial navigation system configured to provide hybrid navigation solutions by executing loose coupling hybridization of inertial measurements originating from the sensors by utilizing measurements supplied by a satellite-positioning receiver which utilizes signals sent by a plurality of satellites distributed across at least two separate satellite of the separate satellite subsets and calculates at least two navigation solutions, each navigation solution being calculated by means of signals sent by the satellites of one of the subsets,
   the inertial navigation system comprising a hybridization module using each of said at least two navigation solutions calculated by the satellite-positioning receiver to calculate hybrid navigation solutions,
   wherein the inertial navigation system comprises a satellite failure detector configured to compare said hybrid navigation solutions and configured to detect incoherence between said hybrid navigation solutions, said incoherence being synonymous with a satellite failure belonging to one of the separate satellite subsets, and wherein the hybridization module is also configured to stop execution of hybridization following detection of incoherence between said hybrid navigation solutions,
   wherein the inertial navigation system provides said hybrid navigation solutions if no incoherence is detected between said hybrid navigation solutions and stop hybridization following detection of incoherence between said hybrid navigation solutions.

2. The inertial navigation system as claimed in claim 1, utilizing the information supplied by a module belonging to the satellite-positioning receiver for receiver integrity surveillance configured to identify and exclude the failed satellite.

3. The inertial navigation system as claimed in claim 2 for which the satellites are distributed across two separate satellite subsets, wherein the hybridization module is also configured to resume execution of hybridization once the failed satellite is identified and excluded.

4. The inertial navigation system as claimed in claim 2 for which the satellites are distributed across at least three separate satellite subsets, and
wherein the satellite-positioning receiver calculates at least three navigation solutions, each navigation solution being calculated by means of signals sent by the satellites of one of the separate satellite subsets,
wherein the satellite failure detector is configured to identify the satellite subset to which the failed satellite belongs after detection of an incoherence between said hybrid navigation solutions, and,
wherein the hybridization module is configured to:
after detection of an incoherence between said hybrid navigation solutions, execute hybridization by using the navigation solutions calculated by the satellite-positioning receiver by using signals sent by the satellites of the separate satellite subsets to which the failed satellite does not belong, said signals sent before the failed satellite is identified, and
once the failed satellite is identified and excluded, to resume execution of hybridization with all the navigation solutions calculated by the satellite-positioning receiver.

5. The inertial navigation system as claimed in claim 1, wherein the satellite failure detector comprises a bank of Kalman filters comprising a principal Kalman filter receiving a mixed navigation solution worked out by the satellite-positioning receiver by means of signals sent by all of the satellites and n secondary Kalman filters each receiving the navigation solution calculated by the satellite-positioning receiver by means of signals sent by the satellites of one of the separate satellite subsets.

6. The inertial navigation system as claimed in claim 1, wherein the satellite failure detector comprises a bank of Kalman filters comprising a principal Kalman filter receiving all the navigation solutions calculated by the satellite-positioning receiver and n secondary Kalman filters each receiving all the navigation solutions calculated by the satellite-positioning receiver excluding the navigation solution calculated by means of signals sent by the satellites of one of the separate satellite subsets.

7. The inertial navigation system as claimed in claim 1, for which the satellites belong to several constellations of satellites.

8. The inertial navigation system as claimed in claim 7, for which each satellite subset corresponds to one of the constellations.

9. A positioning system comprising an inertial navigation system as claimed in any one of claims 1 to 8, and a satellite-positioning receiver which utilizes signals sent by a plurality of satellites distributed across at least two separate satellite subsets and calculates at least two navigation solutions.

10. A process for providing hybrid navigation solutions from a loose coupling hybridization process using inertial measurements utilizing measurements originating from sensors and supplied by a satellite-positioning receiver which utilizes signals sent by a plurality of satellites distributed across at least two separate satellite subsets and calculates at least two navigation solutions, each navigation solution being calculated by means of the signals sent by the satellites of one of the separate satellite subsets,
wherein loose coupling hybridization process provides hybrid navigation solutions corresponding to the result of loose coupling hybridization using each of said at least two navigation solutions, and
wherein the process comprises execution of a comparison of said hybrid navigation solutions to detect incoherence between said hybrid navigation solutions, said incoherence being synonymous with a satellite failure belonging to one of the separate satellite subsets, and
wherein the process provides said hybrid navigation solutions if no incoherence is detected between said hybrid navigation solutions and stop hybridization following detection of incoherence between said hybrid navigation solutions.

* * * * *